UNITED STATES PATENT OFFICE.

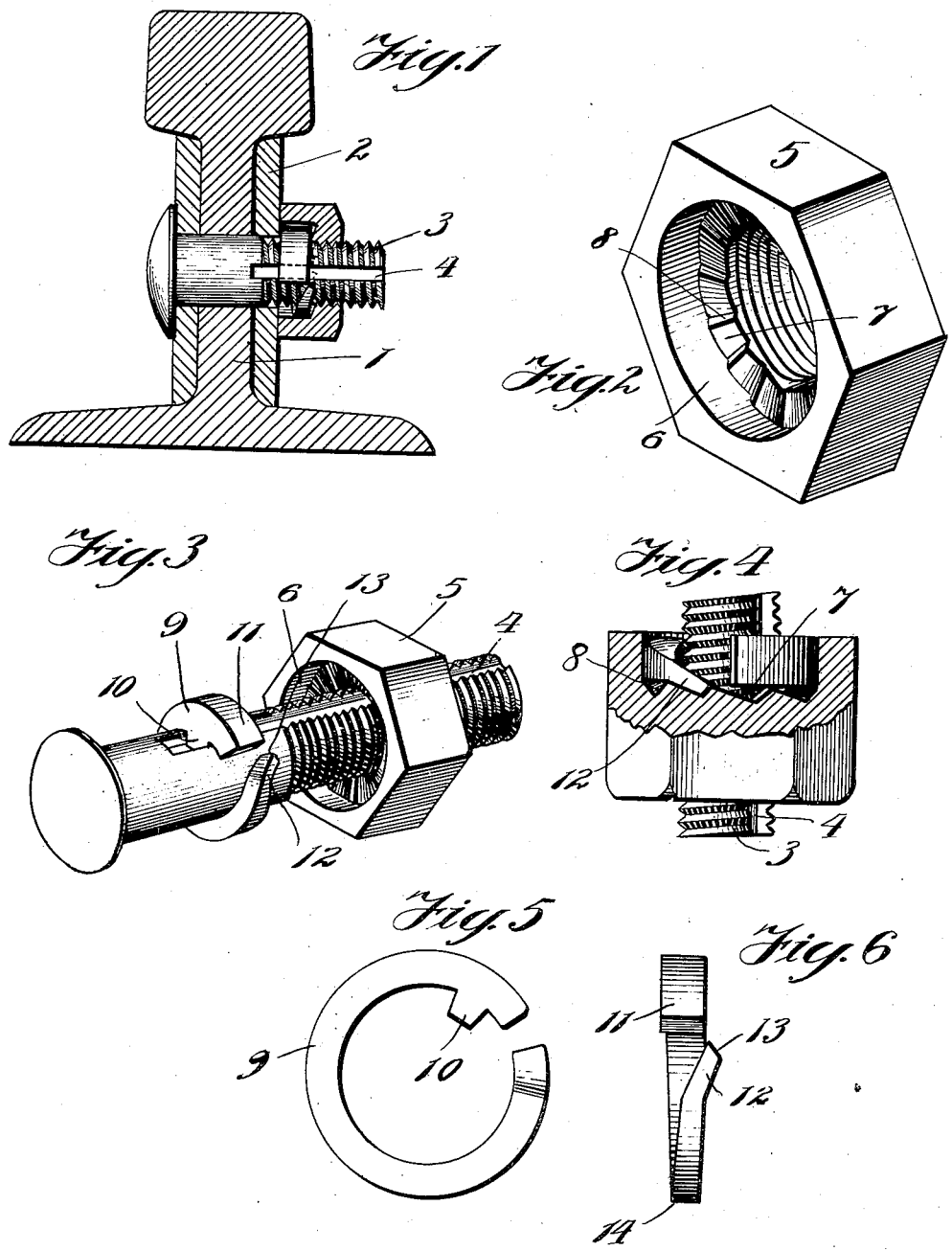

HUBERT L. SMOKE, OF IRONDALE, ALABAMA.

NUT-LOCK.

1,011,871. Specification of Letters Patent. Patented Dec. 12, 1911.

Application filed June 8, 1911. Serial No. 632,031.

*To all whom it may concern:*

Be it known that I, HUBERT L. SMOKE, a citizen of the United States, residing at Irondale, in the county of Jefferson and State of Alabama, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks for bolts, and while applicable to various uses it is particularly designed in connection with railroad rails where constant jarring tends to loosen the nuts.

I am aware of the fact that it is broadly old to provide a locking washer coöperating with means on the bolt to prevent the washer from turning and coöperating with ratchet teeth on the nut to lock the nut against turning when tightened up, and I do not claim these features broadly. In nut locks of this type, heretofore constructed, however, the same have been found impracticable for certain uses, inasmuch as when the nut is wrenched up tight, the lock is so secure that if it is desired to remove the bolt the nut cannot be wrenched back again to loosen it, and under ordinary conditions the bolt or nut has to be destroyed to remove same.

It is the object of the present invention to provide a nut lock which will secure the nut against all ordinary tendencies to turn, but which is of such a construction and so coöperates with the nut that while the latter will not normally turn to loosen same it may be loosened by the application of a wrench.

To more fully describe the invention reference is had to the accompanying drawings illustrating same, in which drawings like characters designate the same parts in the several views, and in which—

Figure 1 is a cross sectional view through a rail joint, showing a bolt and nut in locked position with my invention applied. Fig. 2 is a perspective inside view of the nut. Fig. 3 is a perspective view of the assembled bolt, nut and locking washer in their unlocked position. Fig. 4 is a fragmentary detailed view, the nut being partially broken away and illustrating the locking washer in its interlocked position. Fig. 5 is a side elevation, and Fig. 6 is an edge elevation of the locking washer.

1 designates a rail, 2 the ordinary fish plates, 3 a bolt passing therethrough and provided with means for securing a locking washer, hereinafter described, against rotation, the means illustrated consisting of a groove 4 extending longitudinally of the bolt. 5 designates a nut recessed on its inside face to form a chamber 6, the base of said recess being provided with annularly disposed beveled ratchet teeth having long and short beveled surfaces 7 and 8. 9 is the locking washer provided with the internal lug 10 fitting in said groove 4 to lock the washer against rotation. This washer is in the form of a split ring, having the thickened end 11 and gradually tapering toward its other end, and provided with an inturned tooth 12 provided with a beveled end 13 substantially corresponding in angle with the short beveled faces 8 of the ratchet teeth. It will be understood that this washer is made of resilient material, and in wrenching the nut backward to release same it will be observed that the tapering width of the washer allows a certain amount of spring from a position 14 opposite the tooth 10 as well as a certain amount of independent spring of the offset tooth 12, as hereinafter referred to.

It will be obvious that when the nut is tightened up the offset or inturned tooth will ride over the long beveled faces of the ratchet teeth, drop in the recess formed by the long and short faces of the teeth and the beveled end 13 engage one of the short faces 8 of the ratchet teeth, when the nut is finally wrenched home, the offset tongue or tooth resting in the position shown in Fig. 4 and locking the nut against all ordinary turning strains. Should it be desired, however, to release the nut it will be observed that by applying a wrench and by turning the nut in the opposite direction, the beveled face 13 resting against the short beveled face 8, and being substantially of the same angle, will tend to ride away from its recess, the thickness of the washer at its small end permitting that end of the washer to move outwardly without jamming up against the fish plate, and the tongue 12 having been sprung out of its recess, owing to the resiliency of the tapered end and the tongue itself, the nut is turned one point and the operation repeated until the nut is loose enough to be removed without further wrenching.

It will be understood that I do not limit myself to the exact detail of locking the washer against rotation, but having described a practical and preferred embodiment of my invention the features of novelty will now be pointed out more distinctly in the following claim:

In a nut lock, the combination of a bolt, a nut therefor having an annular recess on its inner face provided on its end wall with annularly disposed ratchet teeth having long and short beveled faces, a locking washer of resilient metal, and means for locking said washer against rotation, said washer comprising a split ring provided with an inturned resilient offset having a beveled end of substantially the same angle as the short beveled faces of said ratchet teeth and the inturned tongue of said washer being bent at an angle substantially corresponding to the long faces of said ratchet teeth, whereby the resilient tongue rests on one side against a long face and the beveled end abuts against a short face of the ratchet teeth, substantially as described.

In testimony whereof, I affix my signature, in presence of two witnesses.

HUBERT L. SMOKE.

Witnesses:
M. N. GEORGE,
J. A. GEORGE.